Patented Dec. 27, 1949

2,492,624

UNITED STATES PATENT OFFICE 2,492,624

PREPARATION OF TETRACHLOROTHIOPHENE

Harry L. Coonradt, Woodbury, and Howard D. Hartough, Pitman, N. J., assignors to Socony-Vacuum Oil Company, Incorporated, a corporation of New York No Drawing. Application February 18, 1947, Serial No. 729,410

6 Claims. (Cl. 260—329)

This invention relates to a new process for preparing tetrachlorothiophene.

This compound has heretofore been prepared principally by the direct chlorination of thiophene at room temperature and subsequent isolation of the desired compound from the resulting crude thiophene-chlorine reaction mixture. The direct reaction between thiophene and chlorine proceeds easily and rapidly under normal conditions to yield a mixture comprising unreacted thiophene, monochlorothiophene, dichlorothiophene, trichlorothiophene, tetrachlorothiophene and chlorine addition products of thiophene.

To obtain a clear-cut separation of the various chlorothiophenes, the method developed over sixty years ago, and accredited to Victor Meyer, has heretofore generally been employed. This method involves heating the crude chlorination reaction mixture with alcoholic potassium hydroxide for several hours to destroy addition products formed during the course of reaction, followed by addition of water and subsequent steam distillation and fractionation of the mixture so obtained to yield the various chlorothiophenes.

The yields of tetrachlorothiophene obtained in accordance with the above described procedure have been small and the process has certain inherent disadvantages which render it inapplicable for the production of this compound in commercial quantities. Foremost of these disadvantages is the excessively long heating time of the crude chlorinated thiophene mixture with alcoholic potassium hydroxide. Under ordinary conditions of chlorination, the resulting thiophene-chlorine reaction mixture frequently requires a heating period with alcoholic potassium hydroxide of the order of one day or longer in order to insure the complete removal of addition products therefrom. Thus, the process heretofore used for obtaining tetrachlorothiophene has been a slow time-consuming operation and yields of resultant product have been comparatively small.

In addition to being a slow, drawn-out procedure, the aforementioned process is unattractive from an economical point of view, when carried out on a commercial basis, since the loss of alcohol or the expense of recovering alcohol from the spent potassium hydroxide solution would greatly increase the overall cost of production. Furthermore, the excessive amount of fuel consumed during the extended heating period of the thiophene-chlorine reaction mixture with alcoholic potassium hydroxide and the labor costs which would be involved in said period render the process totally inadequate as an efficient method for producing tetrachlorothiophene.

In accordance with the present invention, there has now been discovered a method of preparing tetrachlorothiophene which tends to overcome the disadvantages inherent in the process heretofore employed. Broadly stated, the process contemplated herein comprises chlorinating thiophene with chlorine and subsequently maintaining the reaction mixture at an elevated temperature while passing an excess of chlorine through the same for a period of time sufficient to destroy substantially all of the chlorine or hydrogen chloride addition products produced during the course of reaction and contained in the chlorinated mixture.

It has been established that when thiophene is brought into contact with an excess of chlorine, the principal product resulting is a thiophene-chlorine addition product such as the hexachlorothiolane described more completely in copending application Serial Number 747,327, filed May 10, 1947. While the present invention is, of course, not to be limited by any theory, it is believed that upon carrying out the chlorination of thiophene under conditions similar to those required to obtain addition products of the nature of hexachlorothiolane, and then maintaining the resulting thiophene-chlorine reaction mixture at an elevated temperature and preferably passing chlorine gas therethrough, the hexachlorothiolane present is decomposed to yield tetrachlorothiophene and the other less highly chlorinated addition products are decomposed to yield dichloro- and trichlorothiophenes which are further chlorinated to yield tetrachlorothiophene as the principal product.

The present invention thus contemplates a process of preparing tetrachlorothiophene which comprises contacting thiophene with chlorine and subsequently maintaining the chlorinated reaction mixture at an elevated temperature above the boiling point of thiophene for a period of time such that substantially all the addition products produced during the aforesaid chlorination are decomposed to yield a product which, upon fractionation, produces a substantial yield of tetrachlorothiophene. According to the preferable procedure of this invention, chlorine gas will be added to the chlorinated reaction mixture while the same is maintained at an elevated temperature.

It has been found that by carrying out the chlorination of thiophene and subsequent treatment thereof according to the above procedure, the excessively long heating periods, such as have heretofore been necessary with the use of alcoholic potassium hydroxide, can be substantially reduced. The process of preparing tetrachlorothiophene in accordance with the present invention represents an efficient, comparatively rapid method in comparison with the time-consuming process of the prior art. Moreover, the method of this invention is a simple procedure for preparing tetrachlorothiophene which permits higher yields of this compound to be obtained and this, in turn, causes a substantial reduction in the expenditure required per unit of tetrachlorothiophene obtained and hence gives rise to a highly economical and efficient method of production.

It is accordingly an object of the present invention to provide an effective process for preparing tetrachlorothiophene wherein the extensive heating period necessary to the prior art procedure can be substantially reduced to provide a comparatively rapid, efficient process. A still further object is to afford a process for obtaining tetrachlorothiophene in a higher yield than heretofore obtained. A very important object is the provision of an economical method for making tetrachlorothiophene which requires less apparatus and attention than has been necessary in the prior art procedure.

These and other objects which will be recognized by those skilled in the art are attained in accordance with the present invention, wherein tetrachlorothiophene is prepared by contacting thiophene with at least about 4 moles of chlorine per mole of thiophene and thereafter maintaining the thiophene-chlorine reaction mixture, while passing additional chlorine therethrough, at an elevated temperature for a period of time sufficient to decompose substantially all of the addition products resulting during the aforesaid chlorination. Fractionation of the heat-treated mixture so obtained yields tetrachlorothiophene in substantial yield along with other valuable chlorinated thiophene products. The residue resulting from said fractionation consists largely of a compound identified as 3,4,5 - 3'4'5' - hexachloro-2,2'-dithienyl. This compound is isolated by recrystallization of the residue.

The temperature at which chlorination of thiophene is carried out in accordance with the process of this invention may be between about 0° C. and about 200° C. Generally, however, the temperature will be maintained between about 80° C. and about 200° C. since it has been found that the chlorination proceeds with greater ease to produce increased yields of the desired product in the higher temperature range. To effect chlorination, a molar ratio of chlorine to thiophene of at least about 4:1 and preferably higher is employed.

The chlorination will preferably be carried out under reflux. The initial temperature of thiophene at atmospheric pressure will hence be about 80° C. As the chlorination reaction proceeds by the addition of chlorine to the thiophene, the temperature of the reaction mixture rises. The chlorination may be carried out in any suitable manner wherein the thiophene and chlorine are brought into intimate contact. Generally chlorine will be bubbled into thiophene at a rate which will insure thorough mixing and contact of the two reactants, and the temperature of the reaction mixture under such conditions will not generally rise above about 200° C. At the completion of the chlorination reaction, the resulting mixture is maintained at an elevated temperature at or above reflux for a period of time sufficient to decompose chlorine or hydrogen chloride addition products produced during the course of chlorination. The temperature during this period will generally be between about 80° C. and about 200° C., and preferably chlorine gas is passed through the chlorinated mixture while the same is maintained in the above temperature range. This period of heating may extend from comparatively few minutes to several hours and will generally be between about 5 minutes and about 5 hours, depending upon the extent of chlorination and the temperature at which said chlorination was effected. As a general rule, it has been found that relatively shorter heating periods are required when the chlorination is carried out at the higher temperatures.

The aforesaid heating of the reaction mixture resulting upon chlorination is an essential step in the process of this invention. Merely contacting thiophene with an excess of chlorine, even at an elevated temperature, was not sufficient in itself, as will be shown below, to increase the yield of tetrachlorothiophene appreciably. As a general rule, it is desirable to pass chlorine through the chlorinated reaction mixture during the heating period, since the yield of tetrachlorothiophene was greater than when no gas or when an inert gas was so employed. The heating of the chlorinated mixture will usually be carried out at atmospheric pressure although under some conditions it may be desirable to employ pressure, since higher temperatures could thereby be obtained and hence the period of heating correspondingly reduced.

Also, the period of heat treatment may be shortened by terminating the heating before the addition products present in the reaction mixture are completely decomposed and readily removing the remaining addition products present by the addition of a small amount of alkali. The amount of alkaline material necessary under such conditions is only a fraction of that required in the procedure of preparing tetrachlorothiophene as practiced heretofore and the yield of product is substantially higher. Any of the commonly employed alkaline materials may be used for this purpose. Generally, an aqueous solution of a hydroxide or carbonate of the alkali metals or alkaline earth metals or a solid alkali will be used. At the completion of the heating period the chlorinated mixture is fractionated usually under reduced pressure to give a substantial yield of tetrachlorothiophene.

The following examples will serve to illustrate the process of this invention without limiting the same:

*Example 1*

Ten moles of thiophene were chlorinated with 55 moles of chlorine. The mixture was cooled during addition of the first 25 moles of chlorine, maintaining the temperature in the range of from 60–80° C. During the remainder of chlorination, the mixture became heated to a temperature which rose to about 123° C. during the course of the reaction. At the completion of the chlorination, the reaction mixture was maintained at reflux temperature and 20 additional moles of chlorine were slowly passed through the mixture. The temperature rose from 165° C. to 205° C. during this period. The mixture was then heated with 300 milliliters of 10 per cent by weight aqueous sodium carbonate solution at the reflux temperature for three hours. The mixture was then filtered and the organic layer of the resulting filtrate was separated, washed with water, dried over sodium sulfate, and fractionated under reduced pressure to give the following:

| Product | Weight Per Cent of Total |
| --- | --- |
| Trichlorothiophene | 14.3 |
| Tetrachlorothiophene | 79.2 |
| Hexachlorodithienyl | 1.6 |
| High Boilers | 4.0 |
| Loss | 0.9 |

*Example 2*

Thirty-five moles of thiophene were chlorinated with 140 moles of gaseous chlorine. The mixture was cooled during addition of the first 25 moles of chlorine, maintaining a temperature of about 40° C. During the remainer of the chlorination, the mixture was heated at reflux temperature, which rose to about 190° C. during the course of the reaction. At the completion of the chlorination, the reaction mixture was kept at a temperature of 185° C. and a small stream of nitrogen was passed through it for 2½ hours. The mixture was then washed with water and fractionated under reduced pressure to give the following:

| Product | Weight Per Cent of Total |
| --- | --- |
| Dichlorothiophene | 22.4 |
| Trichlorothiophene | 46.3 |
| Tetrachlorothiophene | 27.9 |
| Hexachlorodithienyl | 1.1 |
| High Boilers | 0.7 |

*Example 3*

Ten moles of thiophene were chlorinated with 89 moles of chlorine. The mixture was heated and the temperature during the chlorination was maintained at the reflux temperature of the mixture, rising from about 80° C. at the beginning of the reaction to about 188° C. at the end of the reaction. A stream of nitrogen was passed through the hot reaction mixture maintained at a temperature of 185° C. for a period of 3½ hours. The mixture so treated was then cooled, washed successively with water, a 5 per cent by weight aqueous solution of sodium carbonate and water, and then was fractionated under reduced pressure to give the following:

| Product | Weight Per Cent of Total |
| --- | --- |
| Dichlorothiophene | 2.3 |
| Trichlorothiophene | 29.7 |
| Tetrachlorothiophene | 55.7 |
| Hexachlorothiolane | 7.4 |
| Hexachlorodithienyl | 2.7 |
| Loss | 2.2 |

The above results are to be compared with a procedure in which the heating step following chlorination was omitted, as illustrated by the following:

*Example 4*

Ten moles of thiophene were chlorinated with 68 moles of gaseous chlorine. The mixture was heated and the temperature held between 80° C. and 135° C. during the reaction. The reaction mixture was washed successively with water, a 5 per cent by weight aqueous solution of sodium carbonate, a 5 per cent by weight aqueous solution of thiosulfate, a 5 per cent by weight aqueous solution of sodium carbonate and water. The mixture was then dried over sodium sulfate and fractionated under reduced pressure to give the following:

| Product | Weight Per Cent of Total |
| --- | --- |
| Dichlorothiophene | 0.7 |
| Trichlorothiophene | 4.5 |
| Tetrachlorothiophene | 3.3 |
| Hexachlorothiolane | 80.2 |
| High Boilers | 5.9 |
| Residue | 2.9 |
| Loss | 2.5 |

The above results indicate that mere chlorination of thiophene at an elevated temperature does not give the substantial yields of tetrachlorothiophene obtained in accordance with the process of this invention but that subsequent heating of the chlorinated mixture is apparently an essential factor in the present process.

We claim:

1. A process for preparing tetrachlorothiophene, which comprises reacting thiophene with an excess of chlorine present in an amount greater than about four moles per mole of thiophene, subjecting the reaction mixture resulting from the aforesaid chlorination to an elevated temperature above the boiling point of thiophene while passing chlorine gas through the same for a period of time sufficient to decompose substantially all of the thiophene-chlorine addition products produced during the course of said reaction and thereafter fractionally distilling the heat-treated chlorinated mixture to yield tetrachlorothiophene.

2. A process for preparing tetrachlorothiophene, which comprises reacting thiophene with an excess of chlorine present in an amount greater than about four moles per mole of thiophene, subjecting the reaction mixture resulting from the aforesaid chlorination to an elevated temperature between about 80° C. and about 200° C. while passing chlorine gas through the same for a period of time sufficient to decompose substantially all of the thiophene-chlorine addition products produced during the course of said reaction and thereafter fractionally distilling the heat-treated chlorinated mixture to yield tetrachlorothiophene.

3. A process for preparing tetrachlorothiophene, which comprises reacting thiophene under reflux with at least about four moles of chlorine per mole of thiophene, subjecting the reaction mixture resulting from the aforesaid chlorination to an elevated temperature between about 80° C. and about 200° C. while passing chlorine gas through the same for a period of time sufficient to decompose substantially all of the thiophene-chlorine addition products produced during the course of said reaction and thereafter fractionally distilling the heat-treated chlorinated mixture to yield tetrachlorothiophene.

4. A process for preparing tetrachlorothiophene, which comprises reacting thiophene under reflux with at least about four moles of chlorine per mole of thiophene, subjecting the reaction mixture resulting from the aforesaid chlorination to an elevated temperature between about 80° C. and about 200° C. while passing chlorine gas through the same for a period of time sufficient to decompose a substantial proportion of the thiophene-chlorine addition products produced during the course of said reaction, treating the chlorinated mixture so obtained with an alkaline material to remove remaining thiophene-chlorine addition products and fractionally distilling to yield tetrachlorothiophene.

5. A process for preparing tetrachlorothiophene, which comprises reacting thiophene with at least about four moles of chlorine per mole of thiophene at a temperature between about 80° C. and about 200° C., subjecting the reaction mixture resulting from the aforesaid chlorination to an elevated temperature between about 80° C. and about 200° C. while passing chlorine gas through the same for a period of time sufficient to decompose a substantial proportion of the thiophene-chlorine addition products produced during the course of said reaction, treating the chlorinated mixture so obtained with alkali to remove remaining thiophene-chlorine addition products and fractionally distilling to yield tetrachlorothiophene.

6. A process for preparing tetrachlorothiophene, which comprises reacting thiophene with an excess of chlorine present in an amount greater than about four moles per mole of thiophene, subjecting the reaction mixture resulting from the aforesaid chlorination to an elevated temperature between about 80° C. and about 200° C. while passing chlorine gas through the same for a period of between about 5 minutes and about 5 hours to decompose substantially all of the thiophene-chlorine addition products produced during the course of said reaction and thereafter fractionally distilling the heat-treated chlorinated mixture to yield tetrachlorothiophene.

HARRY L. COONRADT.
HOWARD D. HARTOUGH.

REFERENCES CITED

The following references are of record in the file of this patent:

Ber. 17, 794–5 (1884).
Ber. 19, 650 (1886).